(12) United States Patent
Boegge et al.

(10) Patent No.: US 7,883,114 B2
(45) Date of Patent: Feb. 8, 2011

(54) CAP FOR A SEAT BELT RETRACTOR

(75) Inventors: Herbert Boegge, Wiernsheim (DE);
Alfons Maesing, Muehlacker-Enzberg (DE); Alexander Zeissner, Weissach-Flacht (DE)

(73) Assignee: Dr. Ing. h.c. F. Porsche Aktiengesellschaft, Stuttgart (DE)

( * ) Notice: Subject to any disclaimer, the term of this patent is extended or adjusted under 35 U.S.C. 154(b) by 336 days.

(21) Appl. No.: 12/109,462

(22) Filed: Apr. 25, 2008

(65) Prior Publication Data
US 2008/0265079 A1    Oct. 30, 2008

(30) Foreign Application Priority Data
Apr. 28, 2007    (DE) .................. 10 2007 020 192

(51) Int. Cl.
*B60R 22/34* (2006.01)
(52) U.S. Cl. .................. 280/807; 242/379.1
(58) Field of Classification Search .......... 280/807; 242/379, 379.1
See application file for complete search history.

(56) References Cited

U.S. PATENT DOCUMENTS

| | | | | |
|---|---|---|---|---|
| 5,248,110 A * | 9/1993 | Hiruta et al. | ................ | 242/374 |
| 5,904,371 A * | 5/1999 | Koning | ................ | 280/806 |
| 6,082,655 A * | 7/2000 | Verellen et al. | ................ | 242/379 |
| 6,405,962 B1 * | 6/2002 | Hirase | ................ | 242/379.1 |
| 6,419,178 B1 * | 7/2002 | Kohlndorfer et al. | ...... | 242/379.1 |
| 6,499,554 B1 * | 12/2002 | Yano et al. | ................ | 180/268 |
| 6,722,601 B2 | 4/2004 | Kohlndorfer et al. | | |
| 6,745,969 B1 * | 6/2004 | Gouda | ................ | 242/375 |
| 6,834,821 B2 * | 12/2004 | Nagata et al. | ............. | 242/379.1 |
| 7,530,601 B2 * | 5/2009 | Inuzuka et al. | ............. | 280/807 |
| 2002/0104914 A1 * | 8/2002 | Rankin, VI | ................ | 242/373 |
| 2004/0227030 A1 * | 11/2004 | Nagata et al. | ............... | 242/374 |
| 2005/0029382 A1 * | 2/2005 | Inuzuka et al. | ........... | 242/390.9 |
| 2008/0035778 A1 * | 2/2008 | Belden et al. | ................ | 242/375 |
| 2008/0067275 A1 * | 3/2008 | Sumiyashiki | ............. | 242/379.1 |
| 2010/0072313 A1 * | 3/2010 | Maemura et al. | ............ | 242/379 |

FOREIGN PATENT DOCUMENTS

| | | |
|---|---|---|
| DE | 2 249 989 | 4/1974 |
| DE | 31 40 270 A1 | 4/1983 |
| DE | 91 10 869.1 U1 | 1/1992 |
| DE | 42 31 050 A1 | 3/1994 |
| DE | 601 16 321 T2 | 9/2006 |
| EP | 0 477 918 A1 | 4/1992 |
| EP | 1 733 935 A1 | 12/2006 |

OTHER PUBLICATIONS

German Search Report dated Jan. 15, 2008 with English translation of relevant portion (Ten (10) pages).

* cited by examiner

*Primary Examiner*—Paul N Dickson
*Assistant Examiner*—Drew Brown

(57) ABSTRACT

A cap is provided for a seat belt retractor having a housing. The cap is placed onto a side of the seat belt retractor facing a sensor. The cap is made of aluminum and is equipped with an adhesive plate by which the cap is glued onto the housing. The adhesive plate may consist of a butyl adhesive.

12 Claims, 4 Drawing Sheets

CAP FOR A SEAT BELT RETRACTOR

CROSS-REFERENCE TO RELATED APPLICATION

This application claims the priority of German Application No. 10 2007 020 192.5, filed Apr. 28, 2007, the disclosure of which is expressly incorporated by reference herein.

BACKGROUND AND SUMMARY OF THE INVENTION

The invention relates to a cap for a seat belt retractor. The invention also relates to a seat belt retractor equipped with such a cap.

An important factor in the performance of a seat belt retractor is the noise generated by the retractor. The locking mechanism of a seat belt retractor contains a number of movable parts, which cause the noise in the driving operation. Particularly when the locking mechanism contains a sensor having a movably disposed element for the vehicle-sensitive triggering of the locking mechanism, the sensor is continuously deflected as a result of vibrations during driving and thereby strikes against other parts.

The significance of a low-noise seat belt retractor rises if the retractor is installed in a seat and is arranged close to the upper part of the seat, which brings the retractor very close to a vehicle occupant's ear.

Although, for avoiding such buzzing and rattling noises, the manufacturers of retractors offer components for quieting the sensor mass in the form of wire clamps or the like, these solutions are usually effective only when the seat belt is not worn.

From German patent document DE 42 31 050 A1, a retractor is known which is arranged within a cavity of a column of a motor vehicle. The retractor includes an automatic belt retracting device as well as a belt tightening device. The automatic belt retracting device is enclosed by a housing which includes a base plate. The base plate, on the cavity side, rests against the inside panel of the column and is fastened to the inside panel by use of a single screw. In order to prevent the transmission of structure-borne noise from the automatic retracting device to the column, in the case of the known retractor, a sleeve-shaped elastomer part is provided between the screw, on the one hand, and the inside panel or the base plate, on the other hand.

From German patent document DE 91 10 869.1 U1, a seat belt retractor is known which is equipped with a housing lid constructed as a plastic molded part with a base wall. A plurality of elevations cast to the base wall are provided, which taper in the forming-out direction of the housing lid and form a sound-absorbing labyrinth structure.

It is an object of the invention to reduce the noise of a seat belt retractor in an easily implemented manner.

According to the invention, this object is achieved by providing a cap for a seat belt retractor having a housing, which cap can be placed on a side of the housing of the seat belt retractor that is assigned to a sensor. The cap is made of aluminum and is provided with an adhesive plate, by which the cap is glued to the housing. Advantageous further developments are described and claimed herein.

The cap according to the invention consists of aluminum and is provided with an adhesive plate by way of which the cap is glued onto a housing of the seat belt retractor. The noise generated by the sensor of the seat belt retractor is reduced by the cap having the adhesive plate.

In an advantageous embodiment, the adhesive plate consists of an elastomer, particularly of a butyl adhesive. The butyl adhesive has good noise reduction characteristics and a good stability with respect to acid and alkali.

Additional advantages and further developments of the invention are contained in the following description and the attached drawings.

It is understood that the above-mentioned characteristics which will be explained in the following can be used not only in the respectively indicated combination but also in other combinations or alone without leaving the scope of the present invention.

The invention is schematically illustrated in the drawings by means of several embodiments and will be described in detail in the following with reference to the drawings.

DETAILED DESCRIPTION OF THE DRAWINGS

Figure 1:
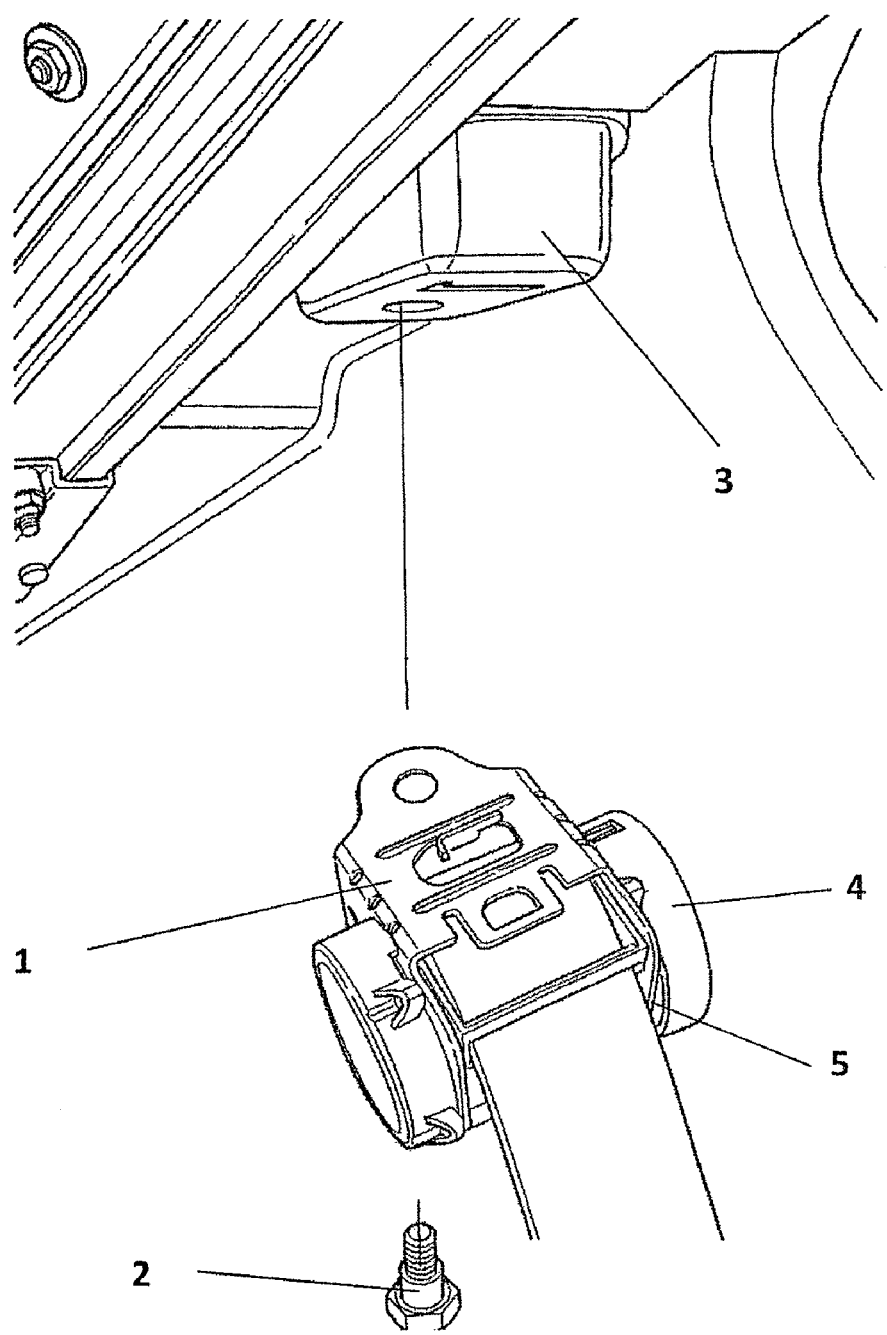
FIG. 1 is a schematic representation of the fastening of a seat belt retractor having a cap according to the invention on a vehicle body.

FIG. 1 illustrates the fastening of a seat belt retractor 1 by use of a screw 2 on a vehicle structure 3. The seat belt retractor is arranged inside the B column, specifically at the level of the seat occupant's ear. The seat belt retractor has a locking mechanism which contains a sensor (not shown) having a movably disposed element for the vehicle-sensitive triggering of the locking mechanism. The sensor is continuously deflected by vibrations in the driving operation and in the process strikes against other components, which generates noise. For reducing this noise, a cap according to the invention is placed at least on a sensor-side face 5 of the seat belt retractor.

Figure 2:
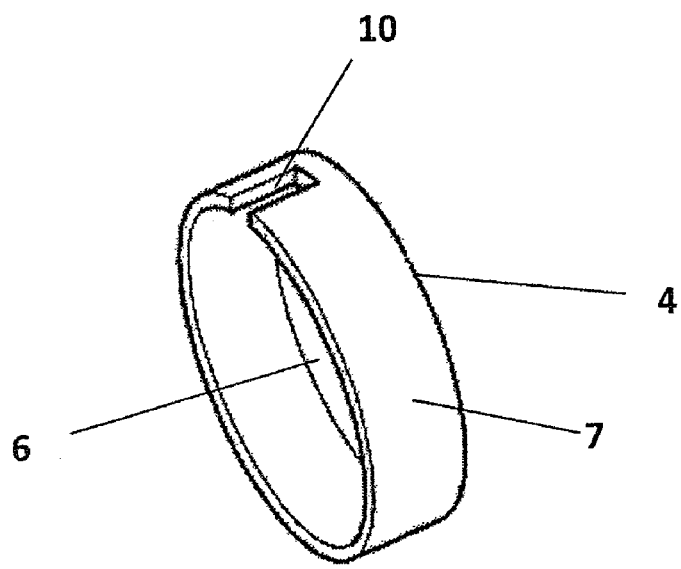
FIG. 2 is a perspective view of a cap according to the invention.

FIG. 2 shows the cap 4 according to the invention in an un-mounted condition. The cap 4 has an essentially circular base part 6 with a wall 7 surrounding the base part 6 at a right angle. The cap 4, therefore, essentially has a flat shell shape, which is illustrated in the figures. A metal is used as the material for the cap. Preferably, the cap 4 is made of aluminum.

Figure 3:
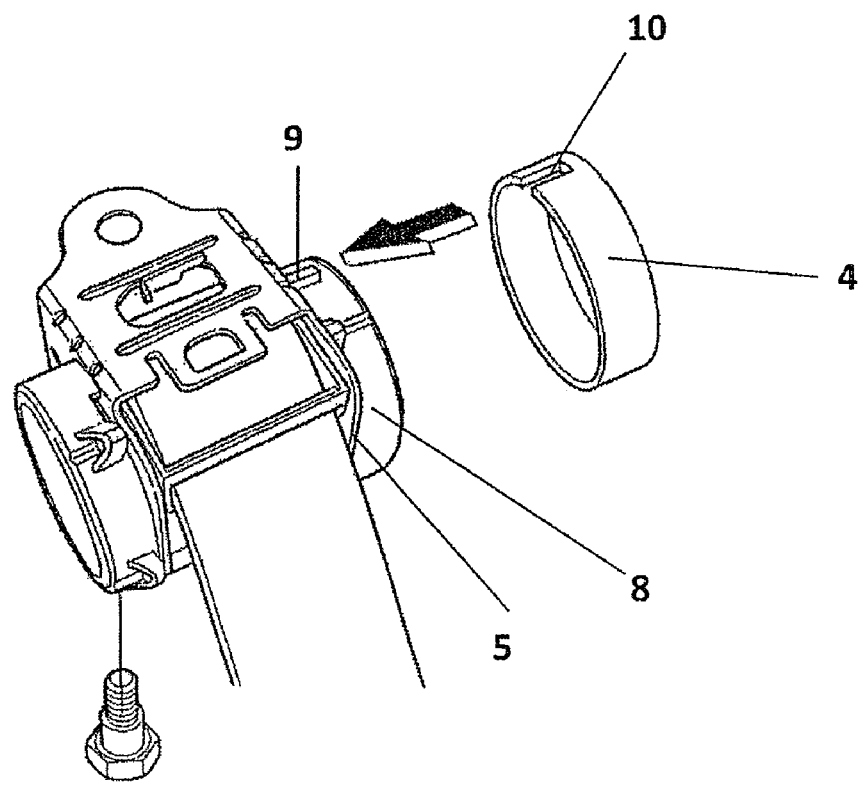
FIG. 3 is a schematic representation of the placing of the cap according to the invention onto the seat belt retractor.
Figure 4:
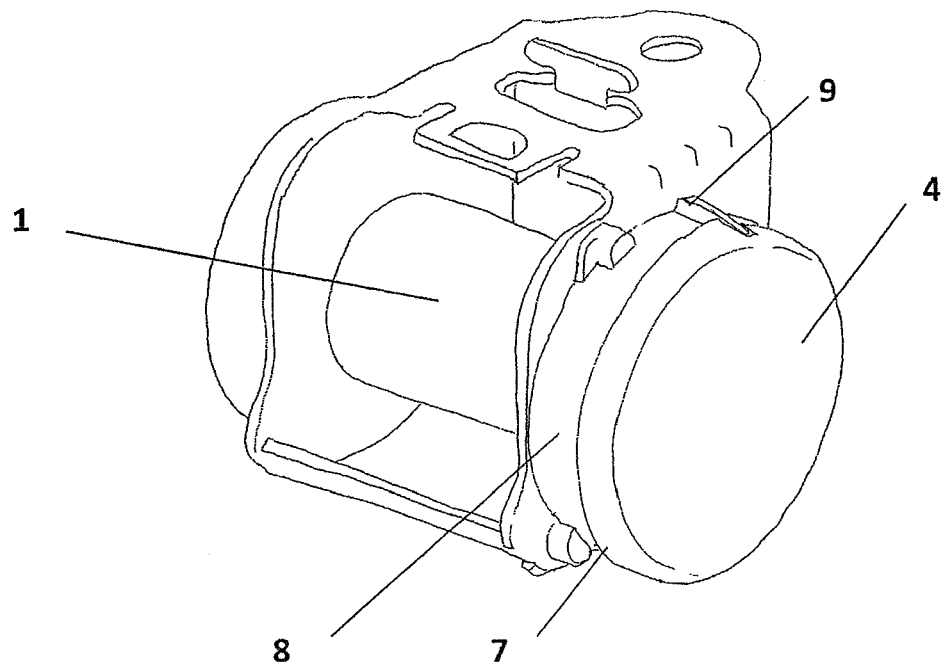
FIG. 4 is a schematic representation of a seat belt retractor having a cap according to the invention.

FIG. 3 shows how the cap 4 is placed onto a housing 8 of the sensor-side face 5 of the seat belt retractor. The housing 8 is made of a plastic material. Identical elements shown in the figures have the same reference numbers. The face 5 of the plastic housing 8 is essentially cylindrical and has at least one elevation 9 at a point on its exterior surface. The wall 7 of the cap 4 has a corresponding notch or recess 10 which, when the cap 4 is placed on the plastic housing 8, receives the elevations 9, so that the cap 4 can be moved into the correct position, which is illustrated in FIG. 4. Naturally, several elevations 9 may be provided around the circumference of the plastic housing, and several corresponding notches or recesses 10 may be provided in the cap 4.

Figure 5:
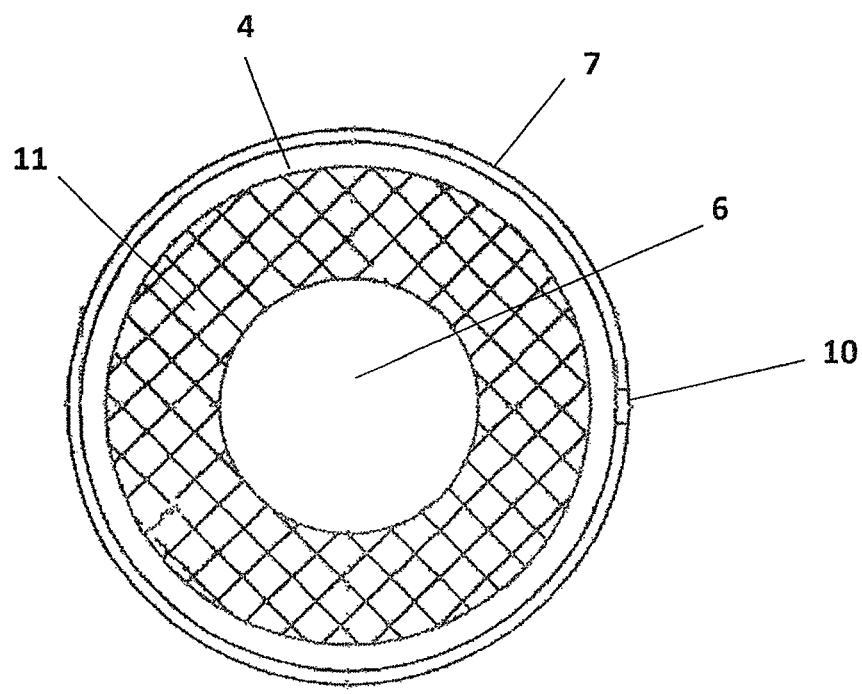
FIG. 5 is a schematic representation of a top view of a cap according to the invention.
Figure 6:
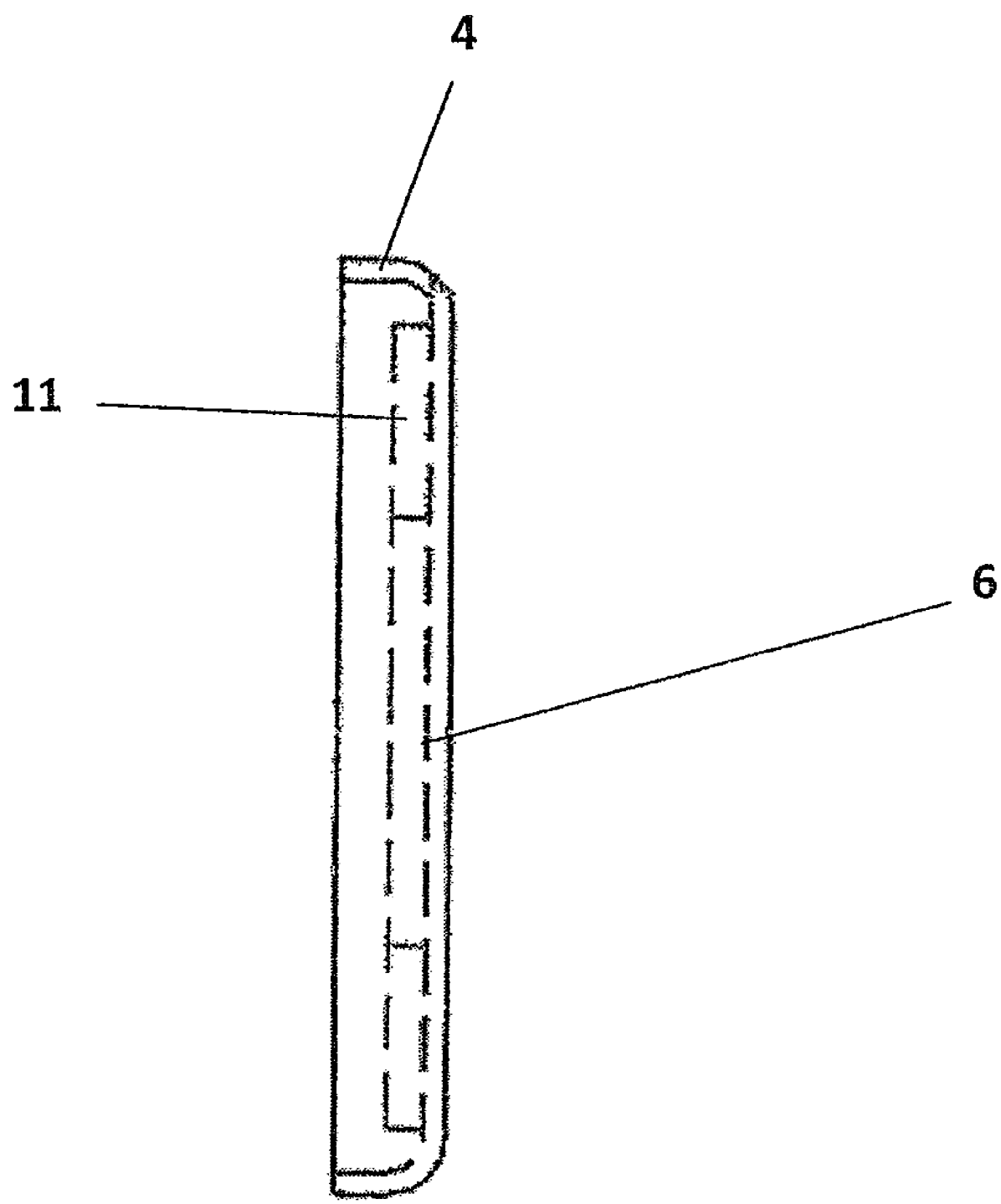
FIG. 6 is a schematic representation of a cross-section through a cap according to the invention.

FIG. 5 is a top view of the cap 4, which is provided with an adhesive plate 11 by which the cap 4 is connected with the plastic housing 8 in a self-adhesive manner. The adhesive plate 11 is glued onto the base surface 6 of the cap 4 and has an essentially ring-shaped construction.

The adhesive plate 11 consists of an elastomer and, preferably, of a butyl adhesive. The butyl adhesive may be plastically deformable at room temperature, which promotes the gluing of the cap 4 onto the plastic housing 8. The butyl adhesive also has good noise reduction characteristics and a good stability with respect to acid and alkali. The adhesive plate 11 is formed of a butyl cord, which is inserted under pressure in a round shape. The butyl cord is advantageously pressed to a length of 2 mm to 3 mm, and preferably to 2.5 mm.

The preceding description of the embodiments according to the present invention is used only for illustrative purposes and not for the purpose of limiting the invention. Particularly with respect to several preferred embodiments, it indicates to a person skilled in the art that various changes and modifications can be made with respect to the design and the detail without deviating from the idea and scope of the invention. Correspondingly, the disclosure of the present invention should not be limiting. Instead, the disclosure of the present invention has the purpose of illustrating the scope of the invention which is indicated in the following claims.

What is claimed is:

1. A component for a seat belt retractor having a housing, comprising:
   a cap operatively configured for placement on a side of the housing of the seat belt retractor which is assigned to a sensor, the cap being made of aluminum and having a circular base part; and
   a ring-shaped adhesive plate formed with a butyl adhesive glued inside onto said circular base part of the cap, the ring-shaped adhesive plate adhesively adhering the cap to the housing and providing sound dampening of the seat belt retractor.

2. The component according to claim 1, wherein the adhesive plate is made of an elastomer.

3. The component according to claim 2, wherein the elastomer is a butyl adhesive.

4. The component according to claim 3, wherein the adhesive plate is plastically deformable at room temperature.

5. The component according to claim 2, wherein the adhesive plate has a thickness of between 2 mm to 3 mm.

6. The component according to claim 1, wherein the adhesive plate is plastically deformable at room temperature.

7. The component according to claim 1, wherein the cap comprises a circumferential wall arranged at a right angle to the base part at an outer circumference thereof.

8. The component according to claim 7, wherein the wall has at least one notch operatively configured to receive a corresponding elevation arranged on the housing.

9. The component according to claim 1, wherein the adhesive plate has a thickness of between 2 mm to 3 mm.

10. A seat belt component, comprising:
    a seat belt retractor having a housing, one side of the housing being assigned a sensor;
    a cap arranged on the one side of the housing assigned the sensor, the cap being made of aluminum and having a circular base part; and
    a ring-shaped adhesive plate formed with a butyl adhesive glued inside onto said circular base part of the cap for securing the cap to the one side of the housing and providing sound dampening of said seat belt retractor.

11. The seat belt component according to claim 10, wherein the adhesive plate is made of a butyl adhesive.

12. The seat belt component according to claim 11, wherein the adhesive plate is in a ring-shape and has a thickness of between 2 mm to 3 mm.

* * * * *